Jan. 9, 1962 D. T. DANIELE 3,015,941
ADJUSTABLE SHAFT COUPLING
Filed Sept. 2, 1960 3 Sheets-Sheet 2

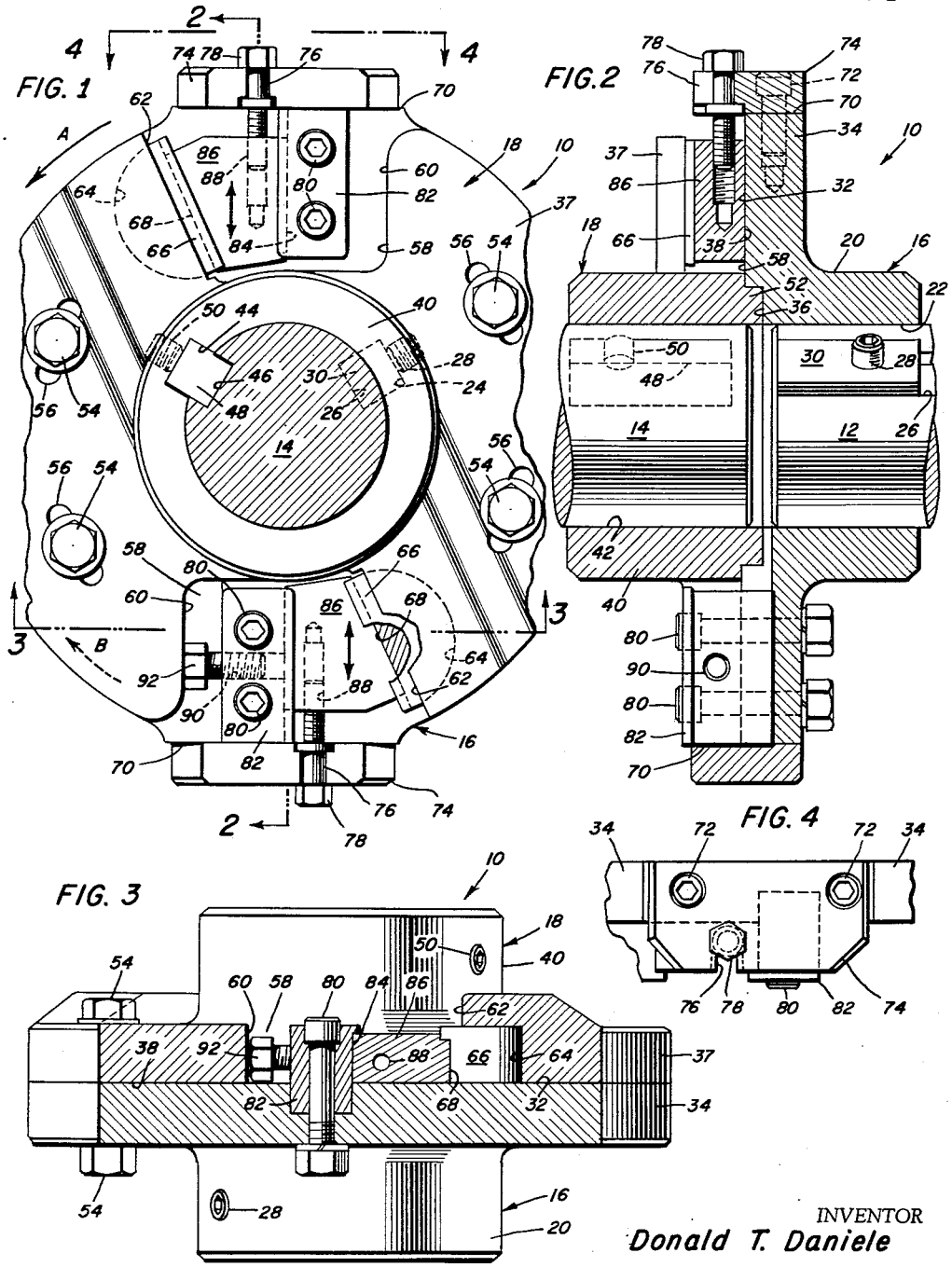

INVENTOR
Donald T. Daniele

BY Karl W. Flocks
ATTORNEY

Jan. 9, 1962  D. T. DANIELE  3,015,941
ADJUSTABLE SHAFT COUPLING
Filed Sept. 2, 1960  3 Sheets-Sheet 3
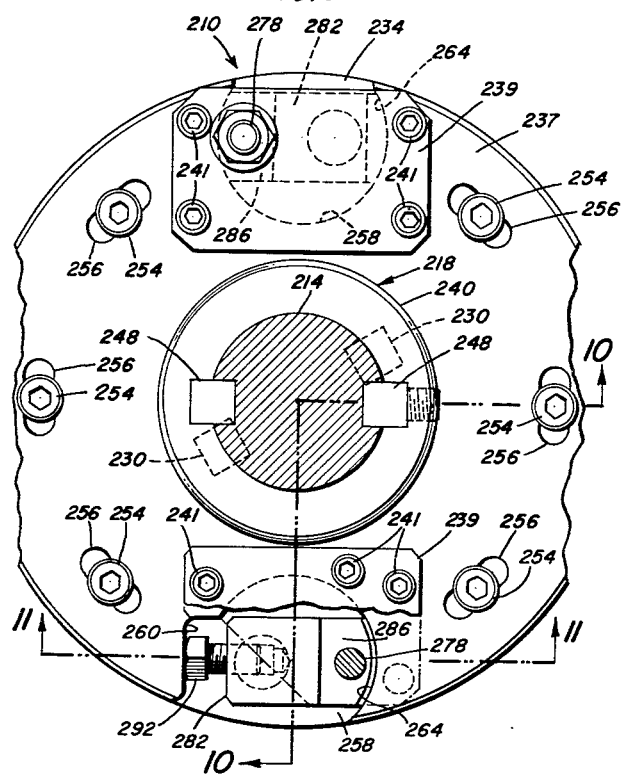
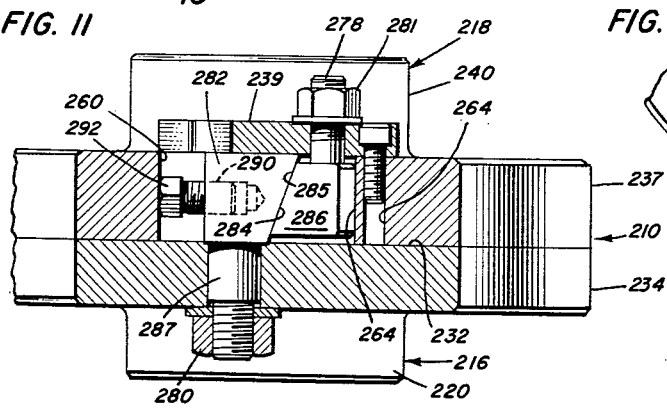
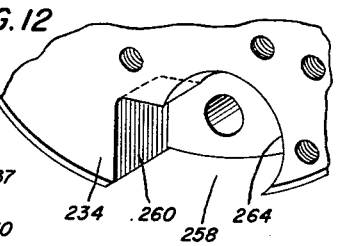
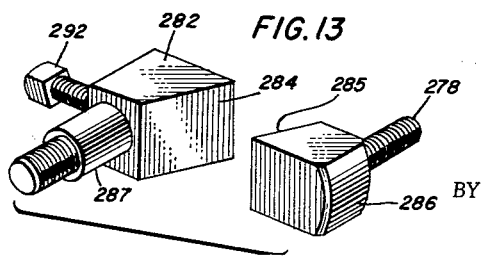
INVENTOR
Donald T. Daniele
BY Karl W. Flocks
ATTORNEY United States Patent Office
3,015,941
Patented Jan. 9, 1962

3,015,941
ADJUSTABLE SHAFT COUPLING
Donald T. Daniele, East Longmeadow, Mass., assignor to Diamond National Corporation, New York, N.Y., a corporation of Delaware
Filed Sept. 2, 1960, Ser. No. 53,677
17 Claims. (Cl. 64—24)

This invention relates generally to the problem of transmitting torque between substantially axially aligned shafts, and is more particularly concerned with providing means for adjustably yet rigidly coupling such shafts with the provision for relatively adjusting said shafts, within limits, about their longitudinal axis.

The problem of relative radial adjustment of a driving and driven shaft is especially important and requires a considerable degree of accuracy where mechanism such as gears, cams, etc., are splined, keyed, etc., onto the shafts, and further where such mechanisms have a particular control function in automatically operating machinery.

A primary object of the invention is to provide an adjustable shaft coupling permitting proper torque transmittal between a pair of shafts without excess forces being imposed on the adjusting portions of the mechanism.

Another object of the invention is to provide a shaft coupling facilitating proper torque transmittal and permitting relative rotation between driving and driven shafts and further providing means whereby timing components may be readily and accurately brought into exact timed relation.

A further object of the invention is to provide an adjustable shaft coupling which affords all the advantages of a rigid coupling and includes means whereby shafts may be rotated with respect to each other about their longitudinal axis.

Still another object of the invention is to provide adjustable shaft couplings attaining improved static and dynamic balancing characteristics.

Other objects and the nature and advantages of the instant invention will be apparent from the following description of a preferred embodiment of the invention taken in conjunction with the accompanying drawings, wherein:

FIG. 1 is a front elevation of one embodiment of the adjustable shaft coupling of the invention, with fragmentary portions broken away for purposes of clarity;

FIG. 2 is a section taken on line 2—2 of FIG. 1;

FIG. 3 is a section taken on line 3—3 of FIG. 1;

FIG. 4 is a fragmentary plan view looking in the plane of line 4—4 of FIG. 1;

FIG. 9 is a front elevation of still another embodiment of the invention, with portions broken away for purposes of clarity;

FIG. 10 is a section taken on line 10—10 of FIG. 9;

FIG. 11 is a section taken on line 11—11 of FIG. 9;

FIG. 12 is an enlarged fragmentary perspective view of a bearing portion of the driving hub of the embodiment of FIG. 9; and FIG. 13 is an enlarged perspective view of the force transmitting elements of the embodiment of FIG. 9, showing the elements substantially in their oriented relationship which is assumed when installed.

Figure 5:
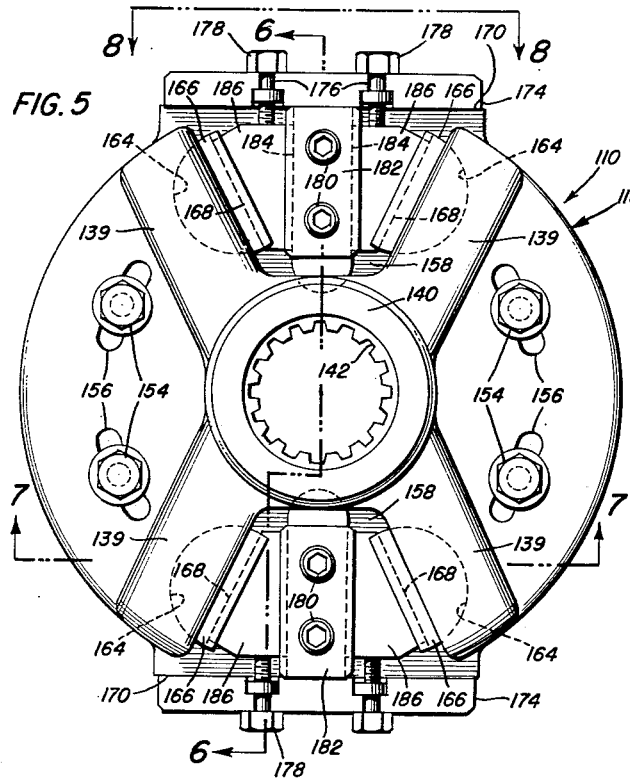
FIG. 5 is an elevational view of another embodiment of the novel adjustable shaft coupling on a slightly reduced scale.

Referring to the drawings in detail, and first considering FIGS. 1–4, an adjustable shaft coupling is indicated generally at 10 and will be utilized to adjustably and rigidly couple a driving shaft 12 to a substantially axially aligned driven shaft 14. The coupling 10 includes a driving hub 16 and a driven hub 18, the driving hub including force transmitting means thereon cooperating with portions of the driven hub to permit relative rotation of the hubs about their longitudinal axis in order to compensate for inaccuracies of various machine components which will be mounted on the shafts and to permit adjustment or "timing" of such components. The particular adjustable force transmitting mechanism will subsequently be described in detail.

In this embodiment of the invention, the driving hub includes an axially projecting mounting collar 20 having a longitudinal bore 22 therethrough in which the terminal end of the driving shaft 12 is received. The bore 22 includes a longitudinal groove 24, see FIG. 1, which is alignable with a longitudinally extending key slot 26 milled in the outer surface of the shaft 12. An "Allen" screw 28 is provided in the collar 20 for maintaining a driving key 30 in the groove 24 and slot 26 to integrate movement between the shaft 12 and the hub 16.

The driving hub 16 includes, opposite the collar 20, a substantially planar face 32 on a substantially annular mounting plate 34 integral with the collar 20. The plate 34 includes an annular recess or undercut portion 36 circumposed about the bore 22.

The driven hub 18 comprises a mounting plate 37 including a planar inner face 38 which will be juxtaposed on the face 32 of the driving hub. The mounting plate 37 is integral with an axially projecting mounting collar 40 having a longitudinal bore 42 which will be disposed in axial alignment with the bore 22 of the driving hub. Included on the inner surface of the bore 42 is a longitudinally extending groove 44 alignable with a key-receiving slot 46 extending longitudinally on the outer surface of the driven shaft 14. A suitable integrating key 48 is retained between the groove and slot 44, 46 by means of an "Allen" screw 50. The driven hub, see FIG. 2, includes an axially projecting, annular orienting shoulder 52 projecting beyond the face 38 of the driven hub and received within the recess 36 of the driving hub.

Extending transversely through a suitable bore in the plate 32 are nut and bolt assemblies 54, see FIGS. 1 and 3, the bolts of which extend through circumferentially spaced, elongated transverse slots 56 formed in the late 37. The nut and bolt assemblies 54 in their cooperating relationship with the slots 56 will permit a predetermined relative rotation between the hubs 16 and 18 about their longitudinal axis and are backed off when the finer adjustment in this regard is obtained by the force transmitting mechanism which will be described.

The plate 37 includes diametrically opposed, radially opening cutout portions 58 which are mirror images of each other and accordingly only one of the force transmitting mechanisms will be described in detail relative to one of these cutout portions 58. The cutout portion 58 includes a chorally disposed abutment shoulder 60 and a radially extending shoulder 62. Formed inwardly of the shoulder 62, see FIGS. 1 and 3, is a semi-circular bearing recess portion 64 opening into the face 32 of the plate 34, see FIG. 3, and rotatably received therein is a semi-circular bearing 66 which includes a diametrical undercut abutment surface 68.

Formed on the plate 34 in diametrically opposed relationship are milled, chordally disposed support surfaces 70. Secured by means of "Allen" screws 72 on the support surfaces 70 are mounting plates 74 which project in overlying relationship to the cutout portions 58 of the plate 37. The plates 74 include a slot 76 opening toward the plate 34 and removably and rotatably receiving therein a substantially radially disposed adjusting screw 78.

Secured by means of suitable "Allen" screws 80 on the face 32 of the plate 34 is a radially disposed driving key 82 which includes an undercut abutment surface 84 in opposed relationship to the abutment surface 68 of the bearing element 66. Interposed between the abutment surfaces 68 and 84 of the element 66 and driving key 82 is an inwardly converging wedge element 86 which includes opposed side portions slidably received and retained on the abutment surfaces 68 and 84, see FIG. 3. The wedge element 86 includes in its outer end a suitably tapped bore 88 which receives the lower end of the adjusting screw 78 therein.

The structure just described will facilitate adjustment or relative rotation between the hubs 16 and 18 whereby the driven hub 18 may be rotated in the direction indicated by the arcuate direction arrow A of FIG. 1. In order to obtain rotation in the opposite direction, as indicated by the dotted arcuate direction arrow B of FIG. 1, one or the other of the driving keys 82 includes a laterally opening threaded bore 90 in which is received an abutment screw 92 accessible for adjustment through the cutout portion 58, as clearly seen in FIGS. 1 and 3. The head of the abutment screw 92 will engage the chordally disposed abutment surface 60 of the cutout portions 58 depending upon which driving key 82 the abutment screw 92 is located.

Although a single force transmitting mechanism comprising a driving key 82, wedge element 86, and bearing element 66 in the just described cooperating relationship may be used independently of a diametrically opposed mechanism of the same character, the utilization of diametrically opposed mechanisms aids to statistically and dynamically balance the adjustable shaft coupling. Further, the mechanism for adjusting relative rotation between the driving and driven hubs could be utilized independently of the reverse adjusting screw 92; however, by only providing a single threaded bore 90 and screw 92 in one key and leaving the other driving key 82 undrilled, the amount of material removed from the undrilled key will substantially balance or will be equal to the weight of an adjusting screw 92. This expedient will aid to attain static and dynamic balance of the coupling.

*Operation of the embodiment of FIGURES 1–4*

The driving and driven shafts 12 and 14 are initially mounted in the respective driving and driven hubs 16 and 18. Assuming that relative rotational adjustment is required between the driving and driven hubs, the nut and bolt assemblies 54 are backed off and the slots 56 determine the limits of respective adjustability between these hubs. By rotating the adjusting screw or screws 78, after the screw 92 has been moved into the driving key 82, the wedge elements 86 may be urged radially inwardly causing relative rotation between the hubs in the direction indicated by the direction arrow A. It will be noted that the bearing elements 66 accommodate for this adjustment and torque between the driving and driven hubs is transmitted through the driving key 82, wedge 86, and bearing element 66. After the required adjustment has been made, the nut and bolt assemblies 54 are tightened and the adjustable shaft coupling will properly and efficiently deliver torque between the driving and driven shafts.

After the just described adjustment has been made, the screw 92 is urged into substantial engagement with the abutment surface 60, this feature being an additional factor to maintain the driving and driven hubs in fixed and adjusted relationship.

In the event it is desired to reversely rotate the driven hub 18 with respect to the hub 16, the nut and bolt assemblies 54 are once more loosened, the adjusting screws 78 are backed off to accordingly withdraw the wedge elements 86 and at this time the abutment screw 92 is rotated or urged outwardly from the driving key 82 in which it is mounted to engage the surface 60 and cause such reverse rotation.

Referring to FIGS. 5–8, this embodiment of the novel adjustable shaft coupling comprises structure functioning in substantially the same manner as the embodiment of FIGS. 1–4. However, in order to attain greater static and dynamic balance in addition to more accurate means for attaining relative rotation in either direction of the driving and driven hubs with respect to each other, duplicate opposed adjustable wedges are provided.

This embodiment of the adjustable shaft coupling is indicated generally at 110 and comprises a driving hub 116 and a driven hub 118. The driving hub 116 includes a mounting plate 134 having a substantially planar face portion 132. Projecting axially from the plate 134 is a mounting collar 120 having an internally splined axial bore 122 for receiving the terminal end of a complementary drive shaft (not shown). The driving hub 116 includes an axial undercut shoulder 136 functioning in the same manner as the recess 36 in the previously described embodiment.

Figure 7:
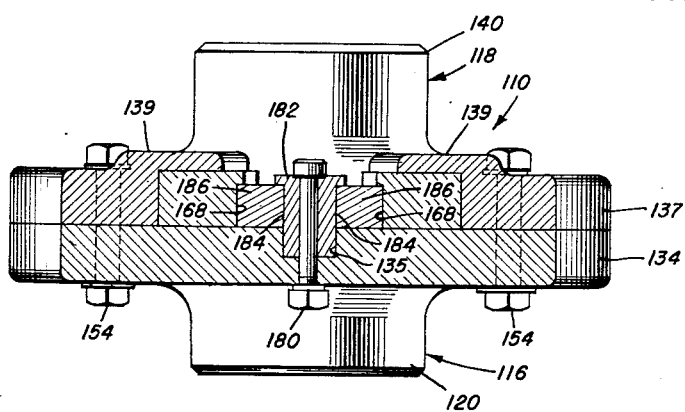
FIG. 7 is a section taken on line 7—7 of FIG. 5.
Figure 8:
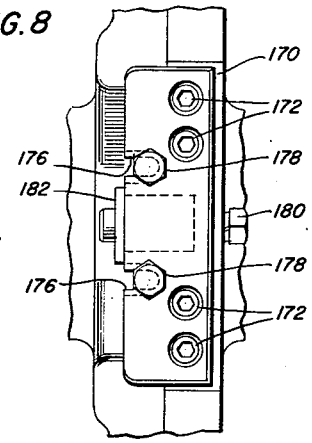
FIG. 8 is a fragmentary plan view looking in the direction of the plane of line 8—8 of FIG. 5.

The plate 134 has milled therein diametrically opposed inwardly extending recesses 135 which have retained therein by means of "Allen" screws 180 radially extending driving keys 182 which include opposed and undercut abutment surfaces 184, see FIGS. 5 and 7. The plate 134 also includes diametrically opposed chordally related milled support surfaces 170 upon which are mounted support plates 174 through the expedient of "Allen" screws 172, see FIG. 8. The plate 174 projects over the plane of a driven hub, mounting plate 137 and includes spaced slots 176 which removably and rotatably receive therein adjusting screws 178. Disposed in circumferentially spaced relationship are nut-and-bolt assemblies 154 extending transversely through the plate 134 and elongated arcuate slots 156 in plate 137 which serve the same function as the nut-and-bolt assemblies 54 of the previously described embodiment.

The driven hub 118 includes a mounting collar 140 including an axial splined bore 142 for receiving therein the terminal end of a suitably conformed driven shaft (not shown), and includes an axial annular orienting recess 152 received on shoulder 136.

Formed in an X-shaped, raised portion 139 including notches 158 are opposed semi-circular bearing recess portions 164 which rotatably receive therein semi-circular bearings or force transmitting elements 166 which include an undercut abutment surface 168 each being opposed to an abutment surface 184 of a driving key 182. Radially disposed and reciprocably supported between the opposed faces 166, 164 are wedge-shaped force transmitting elements 186 which include a suitable tapped outer end portion threadedly receiving the lower end of one of the adjusting screws 178.

Figure 6:
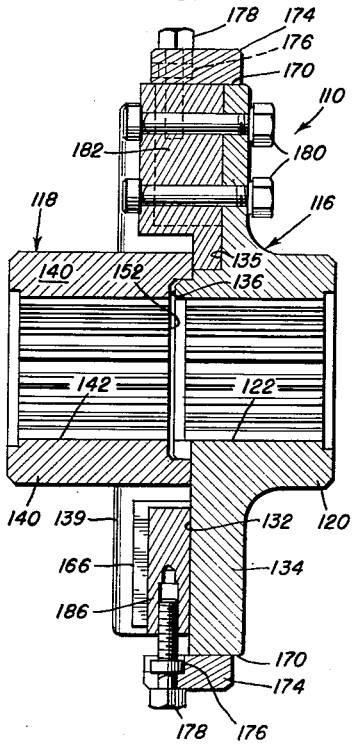
FIG. 6 is a section taken on line 6—6 of FIG. 5.

*Operation of the embodiment of FIGURES 5–7*

After a driving and driven shaft have been suitably mounted in the splined bores 122 and 142, the nut-and-bolt assemblies 154 are backed off and one or the other of the adjacent adjusting screws 178 is rotated in one direction or the other in order to rotate the driven hub 118 with respect to the driving hub 116. The elements 166 will readily facilitate such adjustment for radially repositioning of the wedge elements 186 as in the embodiment of FIGS. 1–4, where the wedge element 86 is accommodated for such adjustment by the bearing element 66. The driving keys 182 provide a positive means for transmitting torque from the driven hub to the driving hub.

It will be noted that the adjustable shaft coupling of FIGS. 5–8 is symmetrical about a horizontal axis, as viewed in FIG. 5, and thus affords optimum static and dynamic balance for the adjustable shaft coupling and the retaining nut and bolt assemblies 154 are retightened after the various adjustments are made.

Referring to FIGS. 9–13, a still further embodiment of the novel adjustable shaft coupling is disclosed. In this embodiment, the driving and driven hub adjusting mechanism is substantially duplicated in order to afford static and dynamic balance.

In this embodiment, the adjustable shaft coupling is indicated generally at 210 and includes a driving hub 216 and a driven hub 218. The driving hub 216 includes a mounting plate 234 having an inner face 232 and an axially projecting shoulder 236. The driven hub includes a mounting plate 237 and the plates 234 and 237 are retained in a fixed position and are permitted to have relative rotation about their longitudinal axis by means of cooperating nut-and-bolt assemblies 254 and slots 256 formed in the mounting plate 237 of the driven hub 218.

The driving hub 216 includes an axially projecting mounting collar 220 having a longitudinal bore 222 receiving therein a driving shaft 212 keyed by means of a key 230. The driven hub 218 includes a mounting collar 240 having an axial bore 242 receiving therein a driven shaft 214 suitably keyed by means of a key 248. The driven hub plate 237 includes an undercut recess 252 received upon the shoulder 236 of the driving hub.

Formed in opposed relationship and opening into the outer periphery of the driven hub plate 237 are fragmentary circular recesses 264 which are closed at one side by means of a retaining plate 239 retained on the driven hub mounting plate 237 by means of "Allen" screws 241. The recesses 264 include a laterally disposed abutment shoulder 260 similar to the abutment surface 60 of the embodiment of FIGS. 1–4.

Mounted in the recess 264 by means of a terminally threaded stud 287 extending through plate 234 is an abutment key 282 which is retained in a fixed position on the plate 234 by means of a retaining nut 280. The key 282 includes an angular abutment surface 284 and opposed thereto in a suitably tapped recess 290 is a reverse-rotation adjustment screw 292. Mounted on the plates 239 by means of a terminally threaded stud 278 is a longitudinally adjustable wedge element 286 having an angular abutment surface 285 complementary to the angular surface 284 of the key 282. The threaded stud 278 is engaged by a suitable nut 281.

It will be noted that the wedge element 286 is narrower than the width of the recess 264 and thus it may be moved longitudinally with respect to the driven hub plate 237. When this screw is moved toward or away from the plate 237, see FIG. 11, and the reverse rotation adjustment screw 292 is backed off, relative movement will be caused between the driven and driving hubs. It will be further noted, that only one of the keys 282 need incorporate the reverse-rotation adjusting screw 292; the other key can remain untapped.

*Operation of the embodiment of FIGURES 9–13*

The retaining nut-and-bolt assemblies 254 are backed off or loosened, the reverse-rotation screw 292 is rotated into the wedge element 282, and as the nut 281 is rotated on the threaded stud 278, the wedge element 286 will be drawn upwardly as seen in FIG. 11 to cause relative rotation between the driving and driven hubs. Reverse rotation is accomplished by loosening the nut 281, and rotating the screw 292 in the proper direction. After the adjustment has been made, the nut and bolt assemblies 254 are once more tightened and the adjustable shaft coupling is ready for operation. The screw 292 can then be adjusted to abut the portion 260.

It will be obvious to those skilled in the art that various changes may be made without departing from the spirit of the invention, and therefore, the invention is not intended to be limited to what is shown in the drawings and described in the specification, but only as defined in the appended claims.

What is claimed is:

1. An adjustable shaft coupling for substantially axially aligned shafts comprising a pair of confronting hubs each including means thereon for respectively securing said hubs to one of said shafts, driving means on one hub, driven means on said other hub, adjustable force transmitting mechanism on said one hub drivingly engaged between abutment portions on said driving and said driven means for adjustably and relatively rotating said hubs in one direction about their longitudinal axis, and fastening means on said hubs including portions permitting said relative rotational adjustment and retaining the hubs in a fixed position with respect to each other, said driven means abutment portion being in the general plane of said other hub and in opposed relation to the abutment portion thereon, said force transmitting mechanism including wedge portions displaceably engageable between said driving and driven means abutment portions.

2. The structure of claim 1; said force transmitting means being disposed radially of said means for securing said hubs to the shafts and including manually manipulable control portions.

3. An adjustable shaft coupling for substantially axially aligned shafts comprising a pair of confronting hubs each including means thereon for respectively securing said hubs to one of said shafts, driving means on one hub, driven means on said other hub, adjustable force transmitting mechanism on said one hub drivingly engaged between abutment portions on said driving and said driven means for adjustably and relatively rotating said hubs in one direction about their longitudinal axis, and fastening means on said hubs including portions permitting said relative rotational adjustment and retaining the hubs in a fixed position with respect to each other, said force transmitting means being disposed radially of said means for securing said hubs to the shafts and including a manually manipulable control portion, said driven means abutment portions being disposed in the general plane of said other hub and in opposed relation to the abutment portion thereon, said force transmitting mechanism including wedge portions displaceably engageable between said driving and driven means abutment portions.

4. An adjustable shaft coupling for substantially axially aligned shafts comprising a pair of confronting hubs each including means thereon for respectively securing said hubs to one of said shafts, driving means on one hub, driven means on said other hub, adjustable force transmitting mechanism on said one hub drivingly engaged between abutment portions on said driving and said driven means for adjustably and relatively rotating said hubs in one direction about their longitudinal axis, and fastening means on said hubs including portions permitting said relative rotational adjustment and retaining the hubs in a fixed position with respect to each other, said force transmitting means being disposed radially of said means for securing said hubs to the shafts and including a manually manipulable control portion, said force transmitting mechanism comprising a wedge element displaceably mounted on said one hub.

5. The structure of claim 1; said hubs including second driving and driven means, and force transmitting mechanism similar and diametrically opposed to that first mentioned.

6. The structure of claim 5; said force transmitting means being disposed radially of said means for securing said hubs to the shafts and including manually manipulable control portions.

7. An adjustable shaft coupling for substantially axially aligned shafts comprising a pair of confronting hubs each including means thereon for respectively securing said hubs to one of said shafts, driving means on one hub, driven means on said other hub, adjustable force transmitting mechanism on said one hub drivingly engaged between abutment portions on said driving and said driven means for adjustably and relatively rotating said hubs in one direction about their longitudinal axis, and fastening means on said hubs including portions permitting said relative rotational adjustment and retaining the hubs in a fixed position with respect to each other, said driving means abutment portions being radially disposed on said one hub and projecting into the general plane of said other hub, said other hub including a bearing portion rotatably supporting said driven means, said driven means abutment surface portion being in the plane of said radially disposed abutment portion of said driving means and positionable angularly relative thereto, said force transmitting mechanism comprising a radially adjustable wedge in the plane of said abutment surface.

8. The structure of claim 7; said bearing portion comprising an arcuate recess opening toward the abutment portion of said driving means, said driven means comprising an arcuate surface portion complementary to said arcuate recess.

9. The structure of claim 7; said hubs including second driving and driven means, and force transmitting mechanism diametrically opposed to and similar to that first mentioned.

10. The structure of claim 5; and adjustable force transmitting means engageable between one of said driving means and said other hub for relatively rotating said hubs in a direction opposite said one direction, said adjustable force transmitting mechanism comprising a second driven means on said other hub disposed in opposition to said first mentioned driven means, and second force transmitting mechanism interposed between said driving means and said second driven means.

11. The structure of claim 10; said force transmitting means being disposed radially of said means for securing said hubs to the shafts and including manually manipulable control portions.

12. The structure of claim 10; said driving means comprising opposed radially disposed abutment surfaces on said one hub and projecting into the general plane of said other hub, said other hub including opposed bearing portions rotatably supporting said driven means, said driven means including an abutment surface in the plane of said radially disposed abutment surfaces of said driving means and positionable angularly relative thereto, said force transmitting mechanism comprising radially adjustable wedges in plane of said abutment surfaces.

13. The structure of claim 7; said bearing portion comprising arcuate recesses opening toward said abutment surfaces of said driving means, said driven means comprising an arcuate surface complementary to said arcuate recesses.

14. An adjustable shaft coupling for substantially axially aligned shafts comprising a pair of confronting hubs each including means thereon for respectively securing said hubs to one of said shafts, driving means on one hub, driven means on said other hub, adjustable force transmitting mechanism on said one hub drivingly engaged between abutment portions on said driving and said driven means for adjustably and relatively rotating said hubs in one direction about their longitudinal axis, and fastening means on said hubs including portions permitting said relative rotational adjustment and retaining the hubs in a fixed position with respect to each other, said driving means on said one hub including a planar surface portion angularly disposed relative to the general plane of said one hub, said force transmitting mechanism including an abutment surface complementary to that of said driving means, and means adjustably mounting said force transmitting means longitudinally on the other hub for movement normal to the general plane of said one hub for causing relative rotation in said one direction between said hubs about their longitudinal axis.

15. The structure of claim 14; and adjustable force transmitting means on said driving means and disposed in the general plane of said one hub and engageable therewith for acting in opposition to said first mentioned force transmitting mechanism for attaining relative rotation between said hubs in an opposite direction.

16. The structure of claim 14; and second driving and driven means, and force transmitting mechanism diametrically opposed to and similar to that first mentioned.

17. The structure of claim 16; and adjustable force transmitting means on said driving means and disposed in the general plane of said one hub and engageable therewith for acting in opposition to said first mentioned force transmitting mechanism for attaining relative rotation between said hubs in the opposite direction.

References Cited in the file of this patent
UNITED STATES PATENTS

| | | |
|---|---|---|
| 1,138,799 | Scott | May 11, 1915 |

FOREIGN PATENTS

| | | |
|---|---|---|
| 485,734 | France | Nov. 12, 1917 |
| 1,108,612 | France | Sept. 7, 1955 |
| 192,295 | Great Britain | Feb. 1, 1923 |